(12) United States Patent
Van Der Meulen

(10) Patent No.: US 7,171,466 B2
(45) Date of Patent: Jan. 30, 2007

(54) METHOD AND SYSTEM AND ARTICLE OF MANUFACTURE FOR IP RADIO STREAM INTERCEPTION FOR NOTIFICATION OF EVENTS USING SYNTHESIZED AUDIO

(75) Inventor: Pieter Van Der Meulen, Sunnyvale, CA (US)

(73) Assignee: Koninklijke Philips Electronics N. V., Eindhoven (NL)

( * ) Notice: Subject to any disclaimer, the term of this patent is extended or adjusted under 35 U.S.C. 154(b) by 1132 days.

(21) Appl. No.: 09/966,074

(22) Filed: Sep. 27, 2001

(65) Prior Publication Data

US 2003/0061615 A1   Mar. 27, 2003

(51) Int. Cl.
G08B 21/00 (2006.01)
G06F 13/00 (2006.01)
H04B 10/00 (2006.01)

(52) U.S. Cl. .................. 709/224; 709/200; 709/206; 709/217; 709/218; 370/540; 370/825.52; 370/535; 370/536; 707/100

(58) Field of Classification Search ............... 709/224, 709/200, 206, 217, 218; 340/540; 707/104, 707/100; 370/535, 389, 473
See application file for complete search history.

(56) References Cited

U.S. PATENT DOCUMENTS

| | | | | |
|---|---|---|---|---|
| 6,813,283 B2 * | 11/2004 | Takashimizu et al. | ...... | 370/535 |
| 6,816,878 B1 * | 11/2004 | Zimmers et al. | ............ | 709/200 |
| 6,934,740 B1 * | 8/2005 | Lawande et al. | ........... | 709/213 |
| 6,954,799 B2 * | 10/2005 | Lerner | ....................... | 709/240 |
| 6,982,970 B2 * | 1/2006 | Takabatake et al. | ........ | 370/329 |

FOREIGN PATENT DOCUMENTS

WO  WO 01 63389 A  8/2001

OTHER PUBLICATIONS

Waring D L et al: "A newly emerging customer premises paradigm for delivery of network-based services" Computer Networks, Elsevier Science Publishers B.V., Amsterdam, NL, vol. 31, No. 4, Feb. 25, 1999, pp. 411-424, XP004304491 ISSN: 1389-1286 abstract p. 412, left-hand column, paragraph 2—p. 413, left-hand column, paragraph 2 p. 418, right-hand column, paragraph 1—p. 420, right-hand column, paragraph 3 figures 1, 4.

* cited by examiner

Primary Examiner—David Wiley
Assistant Examiner—Jude J. Jean-Gilles

(57) ABSTRACT

A system, method, and article of manufacture suitable for transmitting a programmable message in place of or intermixed into a streaming media data stream to a receiving device upon receipt of an event is disclosed. The system comprises an Internet data communications network interface; at least one sending device, operatively connected to the data communications network interface and capable of transmitting a predetermined alert based on the event to a predetermined receiving device upon the occurrence of the event; a persistent data store comprising a predetermined set of selectively retrievable messages; a monitor operatively in communication with both the sending device and an Internet provider of a data stream, the monitor able to selectively access the messages resident on the persistent data store; and messaging software capable of detecting events, selecting at least one of the selectively retrievable messages based on the event, modifying the data stream in a predetermined manner with at least a portion of the selected retrievable message, and transmitting the modified data stream to a predetermined receiving device.

21 Claims, 2 Drawing Sheets

METHOD AND SYSTEM AND ARTICLE OF MANUFACTURE FOR IP RADIO STREAM INTERCEPTION FOR NOTIFICATION OF EVENTS USING SYNTHESIZED AUDIO

BACKGROUND OF THE INVENTION

1. Field of the Invention

The present invention relates to the field of streaming content information over a data network such as the Internet. More specifically, the invention relates especially, but not exclusively, to handling of event-based messaging in conjunction with Internet streaming media. More specifically still, the invention relates especially, but not exclusively, to mixing event triggered messaging into preexisting Internet multi-media data streams such as Internet Radio data streams for delivery to a receiving device.

2. Description of the Related Art

It is known in the art to mix a first presentation of information with a second presentation of information from an independent source. For example, both U.S. Pat. No. 5,912,700, issued to Honey et al, and U.S. Pat. No. 6,154,250, issued to Honey et al, teach a system for enhancing presentation of an object at a sporting event. Both Honey '700 and Honey '250 teach using one or more sensors to determine the position of the object and, based on the position and the field of view of a broadcast camera, editing or augmenting a television signal to enhance presentation of the object. Neither of these teach or suggest basing the editing or augmenting on event driven alerts, local buffering of messages or streams, or use of the Internet.

Over the last several years, provision of audio and/or video streams over the Internet to receiving devices such as personal computers, WebTV™ receivers, or Internet phones has increased. Recently, Internet-based radios ("IP Radios") and other so-called "Internet Appliances" have begun to be marketed as well. These audio and/or video streams can provide an experience equivalent to radio and/or television broadcasts. However, over the years radio and television broadcasts have been subject to a system of event-based interruptions such as during times of emergency. For example, U.S. Pat. No. 5,495,283, issued to Cowe, teaches a cable television messaging system for selectively overlaying or substituting a desired message, for example an Emergency Broadcast System warning, onto multiple channels of a cable television system. Cowe '283 does not teach or suggest basing the editing or augmenting on local event alerts, local buffering of messages or streams, or use of the Internet. No such system for event-based interruptions for Internet streams has been proposed to date.

Incorporated by reference herein, U.S. Ser. No. 09/715,364 filed Nov. 17, 2000 for Pieter van der Meulen ("van der Meulun '064")), for INTELLIGENT APPLIANCE HOME NETWORK, describes a set of consumer devices that can be used in automated home systems. These systems may incorporate alarm systems as well as status monitors and controllers for lights, motors, or appliances. Intelligent appliances may further provide mechanisms for bidirectional communications including the ability to receive commands and transmit status alerts.

For systems that can respond to these status alerts by sending a user definable, user perceptible message, it is preferable for the message to affect ongoing audio and/or video streams, possibly without destroying the audio and/or video stream. It is also desirable to allow for a plurality of alerts such as those comprising status information, configurable by an end user. For example, rather than limit the alerts to Emergency Broadcast System warnings, the end user may wish to have one or more intelligent appliances and/or other devices send alerts to one or more configurable receiving devices, including the same or different intelligent devices.

Additionally, prior art systems do not allow configuring outbound messages that may arise as a result of alerts.

DETAILED DESCRIPTION OF THE PREFERRED EMBODIMENT

In general, throughout this description, if an item is described as implemented in software, it can equally well be implemented as hardware.

Figure 1:
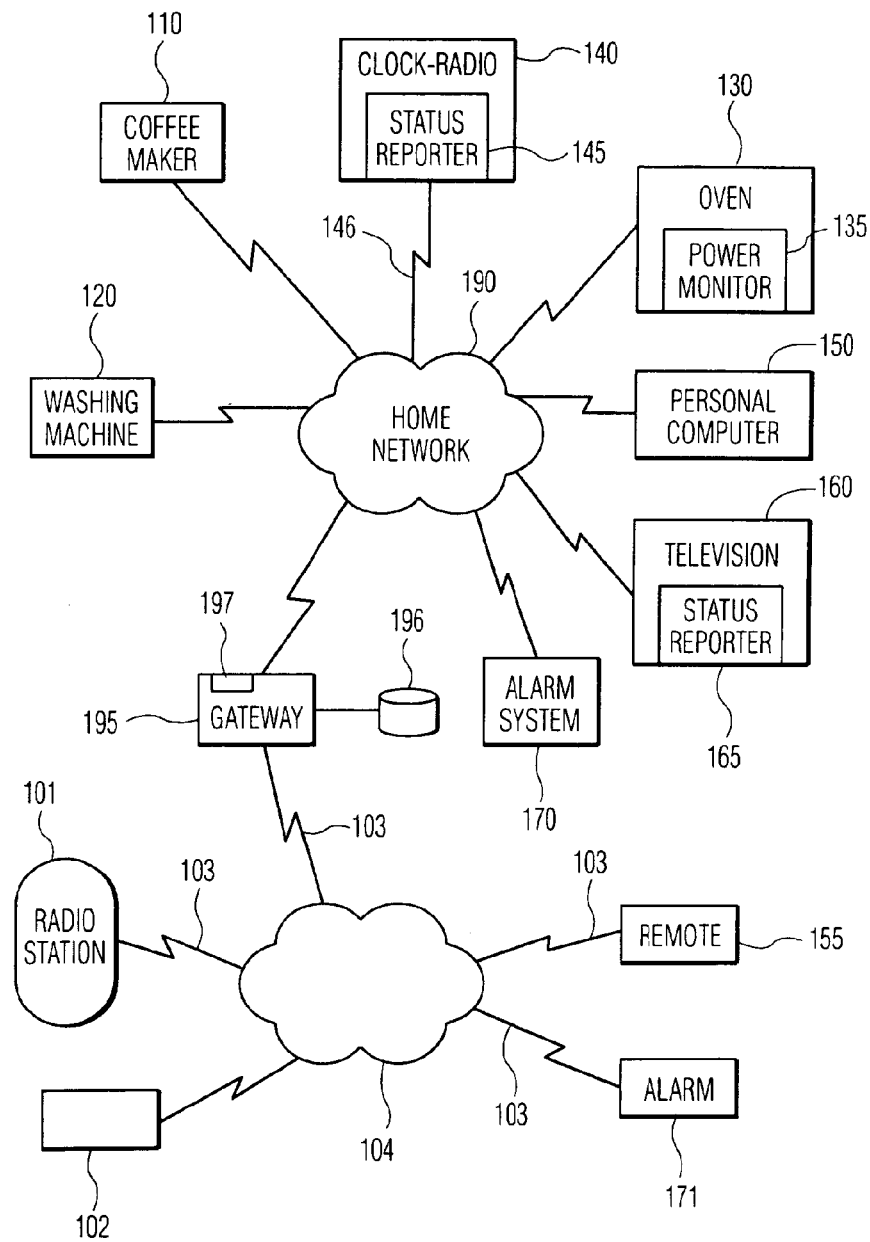
FIG. 1 is a functional block diagrammatic representation of the present invention☐s apparatus.

Referring now to FIG. 1, a schematic diagram of an exemplary local area network 190 embodiment of the present invention, in one presently envisioned embodiment, a message triggered by an event would interrupt a preexisting audio and/or video data stream, where the preexisting data stream may be discarded or stored for later playback such as with a Philips TIVO™ hard disk drive product. In another presently envisioned embodiment, a message triggered by an event would be superimposed over a preexisting audio and/or video data stream. One difficulty with such interruptions or superimposition occurs at the receiving side of the Internet audio and/or video data stream. Many systems today, especially wider bandwidth systems, are implemented using firewalls or gateways (referred to generally as "monitor 195"), whether at home or in an office. These monitors 195 can isolate local area data to a local computer, e.g. 150, and/or local area network 190.

As used herein the term "monitor" can have several configurations. By way of example and not limitation, monitor 195 may comprise a gateway as that term is understood by those skilled in the Internet arts. Monitor 195 may also comprise a standalone device such as clock-radio 140 that is not connected to local area network 190 or that has its own connection to the Internet (identified generally as "104"). Further, connections to the Internet 104 may be via a dial-up modem with appropriate RJ-11 or equivalent connector, a digital subscriber link ("DSL") modem or router with appropriate RJ-11 or equivalent connector, or a cable modem or router having a coax cable connector for connecting to the Internet 104. Additionally, monitor 195 may have a local area network interface such as an ethernet adapter connector for connecting either to a single personal computer 150 or to local area network 190. Local area network 190 connections may comprise wired and/or wireless connections or a combination thereof. Monitors 195 may further implement a firewall such as with IP packet filtering, as these terms are familiar to those of ordinary skill in the Internet arts. Firewall configurations increase a user's safe connections to the Internet 104.

By way of further example and not limitation, monitor 195 may additionally comprise network address translation ("NAT") capability. Monitors 195 that implement NAT allow multiple IP devices such as personal computers 150 or Internet appliances (e.g. coffee maker 110, washing machine 120, oven 130, or clock-radio 140) to connect simultaneously through monitor 195 out to the Internet 104 such as by way of local area network 190. In this configuration, monitor 195 is disposed intermediate the Internet 104 and local area network 190, including those devices connected to local area network 190. In this manner, monitor 195 appears functionally as a single IP device, e.g. a single personal computer 150, to an Internet service provider. To accomplish this, monitor 195 merges outgoing requests and sends incoming data to the appropriate IP device by keeping track internally of which packets are destined for which device (referred to herein as "targets" or "receiving devices").

In a further alternative configuration, monitor 195 may additionally possess bridging capabilities. Many data networks will likely be heterogeneous, and monitor 195 may be a focal point to bridge or connect these various networks. By way of example and not limitation, IEEE 1394 ("Firewire™") may be used to provide communication between two or more audiovisual components in a home, and those same components may connect as a source of audio Motion Pictures Expert Group ("MPEG") level 3 (MP3) for download or playback via monitor 195 to personal computer 150 connected via local area network 190.

In a further alternative configuration, monitor 195 may additionally comprise a local intranet or Internet server. Such a server may be always on and execute multiple, concurrent applications, by way of example and not limitation including world wide web services, other IP based services such as file transfer services, alarm systems, monitors for various home appliances, and/or camera capture systems such as those providing intruder detection capability. If so configured, these applications services may be reachable via the Internet 104 such as via a secure connection that prevents unauthorized access via tapping into the established IP stream by encrypting not only the data but also the login name and password provided by the remote user.

Personal computers 150 and Internet appliances such as clock-radio 140 may connect via the Internet 104 to a source of streaming audio such as Internet radio station 101, much like a traditional AM/FM radio "connects" to a broadcasting radio station. It is understood that local area network 190 could be located in an office, at a residence, or anywhere and is not constrained to connections to local area networks 190 located in a residence. As will be familiar to those of ordinary skill in the computer networking arts, local area networks 190 and data communications networks such as the Internet 104 comprise wired networks such as those utilizing topologies such as ethernet topologies, wireless networks such as Bluetooth networks, or any combination thereof.

As used herein, "Internet Radio" comprises IP packetized audio and/or video data streams such as streaming media as well as text and binary data streams. As will be familiar to those of ordinary skill in the Internet data communications arts, a flow of bytes is commonly referred to as a "stream," and the term "streaming media" is commonly used to describe content that is sent over the Internet 104 in a series of discrete data packets. As will be understood by those of ordinary skill in the Internet software arts, Internet Radio involves sending streaming media data from a server such as Internet Radio station 101 over the Internet 104 to a receiving device, typically a personal computer like personal computer 150 or an Internet appliance such as clock-radio 140. These streaming media data may be formatted in numerous formats including MP3, all of which will be familiar to those of ordinary skill in the data communications arts.

Typically, streaming media content provided by Internet Radio station 101 will include voice and/or music. At times, streaming media data may be downloaded in advance to a cache local to the receiving device for faster or smoother playback, by way of example and not limitation persistent data store 196 or a persistent data store 196 located at receiving stations like personal computer 150 or clock-radio 140. As used herein, persistent data store 196 is a device capable of maintaining programmatically accessible computer interrogatable data, by way of example and not limitation including magnetic hard disk drives, read-only memory devices including flash ROMs, solid state memories, tape devices, optical devices including CDROM and DVD-ROM, or any combination thereof. As further used herein, "hard disk drives" comprise both magnetic and optical media and their associated hardware.

As further used herein, Internet Radio station 101 could be a traditional radio station which is additionally providing content over the Internet 104, an Internet-only station, or any combination thereof. The content is typically a continuous flow of bytes, which provides data at a constant rate (on average) and allows the content from Internet Radio station 101 to be conveyed to a listener. The content, streaming media, are typically transmitted to a web server (not shown in the figures) in a digitized and compressed format and then transmitted outward into the Internet 104 via communications link 103 to the Internet 104. Communication link 103 could be of any suitable type, such as high speed dial-up, integrated services digital network ("ISDN"), digital subscriber link ("DSL"), T1, T3, fiber-optic, wireless, and the like, or any combination thereof.

As mentioned above, while the invention herein is described with respect to Internet Radio, it is equally applicable to other streamed media systems including those which can use local content from a jukebox, by way of example and not limitation video systems. An example of suitable local source for content in the video domain is a hard-disk based recorder, such as the Philips TIVO™ hard disk drive product.

As shown in FIG. 1, Internet appliances and other devices, discussed in van der Meulen '064, may be present behind monitor 195, by way of example and not limitation clock-radio 140, television 160, coffee maker 110, washing machine 120, alarm system 170, and the like, or any combination thereof. These devices may be configured to provide an event-based alert 10 (not shown in the figures) intended for one or more monitoring devices such as monitor 195 or other receiving devices, including to one or more additional receiving devices connected locally to the sending device. As used herein, "event-based" comprises general status or alarm alerts. As also used herein, an "event" comprises connection requests, such as from personal computer 150 to Internet radio station 101; notifications, such as from clock-radio 140 indicating that it can deliver or receive audio; alerts, such as from alarm system 170 or appliance such as coffee maker 110; or any combination thereof.

For example, as discussed in van der Meulen '064, a device such as washing machine 120 may be configured to provide an alert 10 to another local device such as personal computer 150 or television 160 that a laundry cycle has completed. An alarm system such as alarm 170 may be configured to provide an alert 10, by way of example and not limitation such as a door has been opened or a fire alarm triggered, to a local device such as personal computer 150 or television 160 or to a remote device like Internet enabled cell phone 155. Coffee maker 110 may be configured to provide an alert 10 that coffee maker 110 is empty or is consuming abnormal current.

In one embodiment current envisioned, these alerts 10 may be used by a home automation system to determine and/or communicate the state of each configured device as well to provide controls to these devices. In these situations, it is desirable to interrupt packet processing occurring at a receiving device such as personal computer 150, television 160, or clock-radio 140 to allow for notification of alert 10 and optionally for either automated or manual intervention. Additionally, alerts may be generated from devices outside local area network 190, e.g. a device connected to the Internet 104. By way of example and not limitation, it may be desirable to have a remotely monitored device such as alarm system 171 located at remote from a residence, e.g. at work, to notify a home-based system.

On traditional radio or television stations, programs may be interrupted for messages based on external events, for example weather events that trigger the Emergency Broadcast System. Traditional radio or television programming may be interrupted by a variety of means, including tones, special displays, and like. The Internet radio stream may also be interrupted by the source of the data stream, e.g. Internet Radio station 101 may generate its own alerts. It may be desirable to disallow interruption of such Internet Radio station 101 generated interrupts, by way of example and not limitation when a remote radio station is alerting the presence of bad weather that is not applicable to a listener connected via the Internet 104. Mixing is the preferred embodiment, but interruption of the data stream is acceptable, especially where the original data stream will be buffered and played back later such as in an accelerated mode.

In a currently preferred embodiment, monitor 195 is a device capable of independent data processing such as a general purpose personal computer or dedicated, specialized computer. Monitor 195 may be deployed intermediate the Internet 104 and devices connected to local area network 195, by way of example and not limitation devices such as television 160, personal computer 150, and clock-radio 140 connected via local area network 190 to each other and to monitor 195. Alternatively, monitor 105 may be part of television 160, personal computer 150, and/or clock-radio 140 and not connected to local area network 190 such as with a standalone, Internet enabled clock-radio 140.

In a presently preferred embodiment, monitoring software 197 resides and executes within monitor 195. However, monitoring software 197 may reside in totally within monitor 195, totally within any other device operatively connected to local area network 190 capable of executing monitoring software 197, or partially within any combination of monitor 195 and other devices operatively connected to local area network 190 capable of executing monitoring software 197 as will be familiar to those of ordinary skill in the distributed data processing arts. As used herein, "monitor 195" thus further comprises those devices in which monitoring software 197 is executing, as will be familiar to those of ordinary skill in the distributed data processing arts.

Monitoring software 197 monitors events 30 (not shown in the figures) such as alerts 10 from devices local to monitor 195, such as those connected to local area network 190. Monitoring software 197 further comprises access to a local persistent data storage device 196 that contains messages 20 (not shown in the figures) comprising a human perceptible message 20, by way of example and not limitation comprising messages 20 that are perceptible audibly, visually, tactilely, or any combination of these. Each message 20 may be associated with one or more alerts 10 or events 30. Further, a provider or messages 20 and/or an authorized user may configure messages 20 as to content and other properties such as sound, color, destination receiving device, and the like, or any combination thereof. As will be understood by those of ordinary skill in the programming arts, local persistent data storage device 196 may further comprise a database such as a database of messages 20.

Although it is anticipated that many if not most messages 20 will be directed to receiving devices such as personal computer 150 or television 160 collocated with monitoring software 197, e.g. connected via local area network 190, monitoring software 197 may additionally have outgoing access to the Internet 104. A provider of messages 20 or an authorized user may thus configure monitoring software 197 and/or messages 20 to direct a predetermined set of messages 20 to a specific destination external to local area network 190. By way of example and not limitation, one sending device may be alarm system 170. A user may configure monitoring software 197 to direct messages 20 responsive to alerts 10 from alarm system 170 to remote Internet enabled cell phone 155 via the Internet 104.

In an alternative embodiment, monitoring software 197 may receive messages 20 from an external source, such as from manufacturer 102 over the Internet 104. Manufacturer 102 may therefore supply additional or modified messages 20 to be used by monitoring software 197 with that manufacturer's devices.

Figure 2:
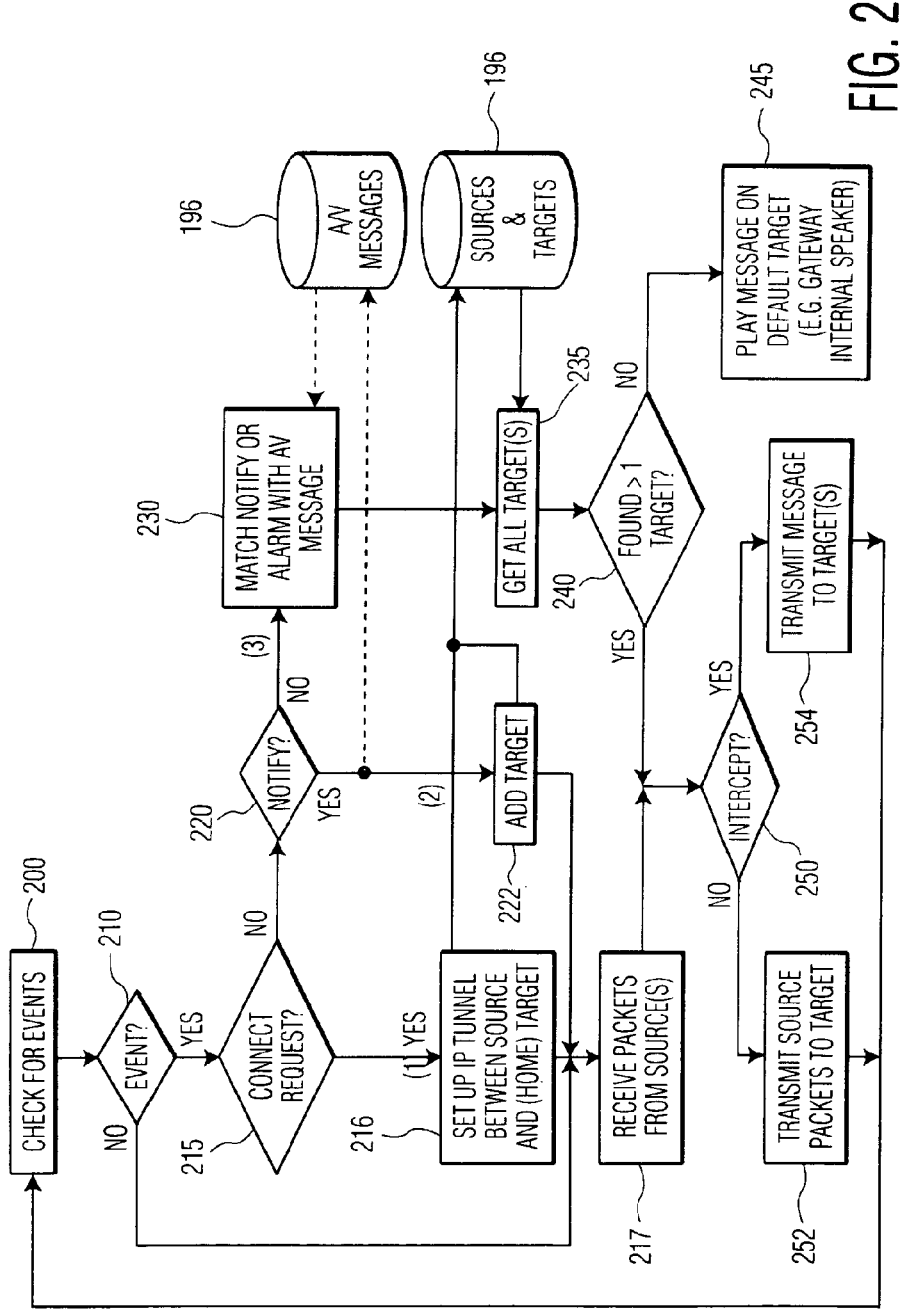
FIG. 2 is a flowchart of the present invention's monitoring software processes.

Referring now to FIG. 2, a flowchart showing the general process of the present invention, monitoring software 197 monitors all packets received at monitor 195 and determines, at 200, if the packets contain Internet data streams and/or events 30. In a preferred embodiment, if monitoring software 197 receives an event 30 comprising an alert 10, monitoring software 197 may interrupt the Internet radio stream and substitute message 20 into the Internet radio stream 254 for the intended receiving device. In an alternative embodiment, monitoring software 197 may mix message 20 into the ongoing Internet radio stream 254 intended for delivery to a receiving device, such as by dynamically lowering the amplitude of the Internet radio stream audio while providing message 20 at an amplitude perceived as louder by a human listener at a receiving device.

In a further alternative embodiment, monitoring software 197 may buffer the ongoing Internet radio stream intended for delivery to a receiving device, such as by storing it to persistent data store 196, send message 20 to a receiving device, and then resume delivery of the buffered Internet radio stream at the point where they were suspended. In these embodiments, data may be buffered for delayed playback. Buffered data can be played back in an accelerated mode, e.g. 25% faster. However, in general the buffering of the data stream needs to continue for a time period that is longer than the time that was needed for the original message. Buffering will generally continue until the accelerated stream has caught up with the original broadcast.

It is to be noted that messages 20 can be sent to more than one receiving device and may be sent to all available receiving devices in case of an high priority message like an alarm; new alerts 10 may be received via the Internet 104 from a "trusted" site, such as the vendor of an Internet appliance, e.g. an Internet enabled washing machine 120; and voices can be prerecorded, by way of example and not limitation by the vendor, spoken in by the user, or synthesized from the text representing the message.

In the currently preferred embodiment, messages 20 are available in a plurality of formats, by way of example and not limitation including text, audio, video, vibration pattern like with pagers, and the like, or any combination thereof. It is also noted that some receiving devices may be capable of rendering message 20 in different ways. By way of example and not limitation, television 160 can do audio and video, but clock-radio 140 would ignore all but the audio. However, if clock-radio 140 also has a display such as an LCD text display, clock-radio 140 could also show the text.

In the operation of the preferred embodiment, referring to FIG. 1 and FIG. 2, monitoring software 197 continually monitors packets received at monitoring software 197. As used herein, packets, as will be understood by those of ordinary skill in the programming arts, may contain specific data that are events 30 or alerts 10 as well as Internet Radio data streams.

Certain packets require no additional processing such as packets already destined for a receiving device. Other packets may be intended for a receiving device for which routing has not yet been accomplished, and monitoring software 197 may establish that routing 216, e.g. clock-radio 140 requesting a new connection to Internet radio station 101.

In the absence of an event 30, monitoring software 197 determines if the received packet requires manipulation 250, by way of example and not limitation if monitoring software 197 is already processing alert messages for the desired receiving device. If not, monitoring software 197 may then allow a received packet to be transmitted without further processing 252 to a target such as clock-radio 140 or personal computer 150.

When an event 30 is detected, at 210, by monitoring software 197, monitoring software 197 determines if the event 30 requires notification 220 to be sent to one or more receiving devices. In certain situations, event 30 notification is of an informational type. By way of example and not limitation, such an event 30 may be from a device such as clock-radio 140 notifying monitoring software 197 or another device of the ability of clock-radio 140 to receive or deliver audio streams. For these events 30, monitoring software 197 may add the device 222 as a target for packets with a set of properties appropriate for that device, e.g. can process audio streams.

Certain events 30 require additional processing. Monitoring software 197 attempts to match 230 these events 30 with a predetermined response such as with an audio or audio-visual message 20 in a database resident in persistent data store 196. Monitoring software 197 retrieves the message 20 such as at step 230 for further processing.

In one currently envisioned embodiment, messages 20 may have properties associated with the messages 20 to instruct monitoring software 197 on handling of those messages 20, by way of example and not limitation including how to handle concurrent streams such as lowering or muting volume or dimming background displays, sounding predetermined tones, repetition counters, further actions required, destination receiving devices, or the like, or any combination thereof.

In a preferred embodiment, if monitoring software 197 determines that the receiving device is also a current destination for one or more Internet radio data streams 250, monitoring software 197 may manipulate the Internet radio data stream according to preconfigured or dynamic rules. By way of example and not limitation, monitoring software 197 may mix the associated message 20 into the Internet radio data stream after lowering the volume attribute of the Internet radio data stream. By way of further example and not limitation, monitoring software 197 may temporarily suspend the Internet radio data stream, buffering the Internet radio data stream for resumption such as upon a predetermined triggering event such as a user acknowledgment.

Monitoring software 197 retrieves all receiving device addresses associated with event 30 for notification at step 235. If additional receiving devices are found 240, message 20 is sent to each additional receiving device. If additional received packets are slotted for transmission to those receiving devices, monitoring software 197 processes message 20 with the received packets 250 before sending 254 the processed packets to the receiving devices.

If no receiving device is found for message 20 at step 240, monitoring software 197 may be configured to support a default receiving device and send message 20 to the default receiving device 245. In the currently preferred embodiment, there is a configurable default receiving device for each message 20. By way of example and not limitation, a speaker that currently is a component of most personal computers 150 could act as the default receiving device for messages 20 destined for monitor 195. Similarly, if there is no known message associated with an event, message 20 may default to a predetermined message 20 such as a message 20 comprising text or synthesized audio or both. By way of example an not limitation, default message 20 might comprise information such as "An alarm has been received from [00device]" where "[00device]" is the device that generated the event.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A system for transmitting a programmable message to a receiving device upon receipt of an event, said system comprising:

an Internet data communications network;

at least one sending device operatively connected to the data communications network, the at least one sending device sending a stream of packets;

at least one further sending device operatively connected to the data communications network, the at least one further sending device transmitting an event in a packet upon a predetermined occurrence;

at least one receiving device operatively connected to the data communications network, the at least one receiving device capable of receiving and processing data, the at least one receiving device receiving and rendering said stream of packets;

a persistent data store;

a predetermined set of selectively retrievable messages stored in the persistent data store;

a monitor operatively in communication with the sending devices, the monitor further being able to access the set of selectively retrievable messages stored in the persistent data store; and monitoring software, at least a portion of which is resident and executable within the monitor, the monitoring software causing the monitor to detect the event in the packet transmitted by the at least one further sending device, to select at least one of the selectively retrievable messages based on the event, to modify data in the packet containing the event to include the selected retrievable message, and to substitute said modified packet for a corresponding packet in said stream of packets, whereby said at least one receiving device renders said selected retrievable message.

2. The system as claimed in claim 1, wherein the data communications network interface is selected from the group of data communications network interfaces consisting of wired networks, wireless networks, and mixed wired and wireless networks.

3. The system as claimed in claim 1, wherein the data communications network further comprises a local area network.

4. The system as claimed in claim 3, wherein the events comprise alerts generated by sending devices operatively connected to the local area network.

5. The system as claimed in claim 3, wherein the monitor is operatively connected to both the Internet and the local area network as a gateway intermediate the Internet and one or more devices operatively connected to the local area network.

6. The system as claimed in claim 1, wherein the at least one receiving device receiving the message from the monitor is selected from a group of receiving devices connected to the local area network and receiving devices operatively connected to the Internet.

7. The system as claimed in claim 1, wherein said at least one receiving device processes the selected retrievable message into data formatted to be rendered into human perceptible experiences.

8. The system as claimed in claim 1, wherein the receiving device comprises intelligent home network appliances, radios, personal computers, and televisions, each of which is capable of rendering the processed data into human perceptible experiences.

9. The system as claimed in claim 1, wherein the persistent data store is a selected from the set of persistent data stores consisting of magnetic media located local to the monitor, magnetic media distributed away from the monitor, optical media located local to the monitor, optical media distributed away from the monitor, solid state memories located local to the monitor, and solid state memories distributed away from the monitor.

10. The system as claimed in claim 1 wherein the system further comprises an external source of messages, wherein the monitoring software causes the monitor to selectively receive and process messages from the external source when selecting at least one of the selectively retrievable messages based on the event.

11. A method of generating messages for transmission to a receiving device, responsive to packets received at a monitor, the monitor operatively connected to the Internet and to the receiving device, the method comprising the steps of:
monitoring original packets being received by a receiving device;
selecting at least one retrievable message from a set of retrievable messages responsive to a received event for packets of said original packets comprising at least one event; and
for each receiving device associated with the selected retrievable message, replacing each original packet being received by the receiving device with a new packet comprising a predetermined portion of the selected retrievable message for the duration of the selected retrievable message.

12. The method as claimed in claim 11, wherein said method further comprises the step of:
sending the retrievable messages selected based on the received event to at least one default receiving device if no receiving devices are associated with the retrievable messages selected based on the received event.

13. The method as claimed in claim 11, wherein said replacing step further comprises the step of:
mixing a predetermined portion of the selected retrievable message with a predetermined portion of an input streaming media data stream contained in the original packet into a new streaming media stream contained in the new packet.

14. The method as claimed in claim 13, wherein said replacing step further comprising the steps of:
altering an audio portion of the input streaming media data stream to a predetermined level before mixing the predetermined portion of the selected retrievable message with the predetermined portion of the input streaming media data stream into a new streaming media stream; and
altering a video portion of the input streaming media data stream to a predetermined level before mixing the predetermined portion of the selected retrievable message with the predetermined portion of the input streaming media data stream into a new streaming media stream.

15. The method as claimed in claim 11, wherein said replacing step further comprises the step of:
storing a predetermined portion of the original packet for later retrieval before replacing each original packet with a new packet comprising a predetermined portion of the selected retrievable message.

16. The method as claimed in claim 11, wherein said method further comprising the step of:
enabling an authorized end user to modify at least one property of the set of retrievable messages for the set of retrievable messages further comprising at least one property for each retrievable message.

17. The method as claimed in claim 16, wherein the modifiable property of the set of retrievable messages comprises a destination address, audio content, visual content, and subsequent actions to be performed by at least one of the devices at the destination address.

18. The method as claimed in claim 11, wherein said method further comprises the steps of:
receiving messages from an authorized third party source of messages;
associating the messages received from the third party with at least one event; and
storing the messages received from the third party into the set of retrievable messages.

19. An electronic event-based messaging system comprising:
means for receiving a first packet from the Internet;
means for analyzing the first packet to determine if it contains an event;
means for retrieving at least one message associated with the event from a set of retrievable messages for first packets containing events;
means for transforming data in the first packet into a set of data in a second packet containing at least a portion of the retrieved message; and
means for substituting the second packet for the first packet for destination addresses required by the first packet that are also required by the second packet.

20. A packet-based messaging system stored via a data storage medium, said packet-based messaging system comprising:
a first plurality of binary values for receiving a first packet over the Internet;

a second plurality of binary values for analyzing the first packet to determine if it contains an event;

a third plurality of binary values for retrieving at least one message associated with the event from a set of retrievable messages for first packets containing events;

a fourth plurality of binary values for transforming data in the first packet into a set of data in a second packet containing at least a portion of the retrieved message; and a fifth plurality of binary values for substituting the second packet for the first packet for destination addresses required by the first packet that are also required by the second packet.

21. A computer program embodied within a computer-readable medium for causing a processor to perform the method as claimed in claim 11.

* * * * *